United States Patent [19]

Tamir

[11] Patent Number: 4,804,478

[45] Date of Patent: Feb. 14, 1989

[54] METHOD AND AN ARRANGEMENT FOR THE TREATMENT AND DISINFECTION OF SWIMMING AND BATHING RESERVOIR WATER USING CHLORINE AND OZONE

[76] Inventor: Shlomo Tamir, Lichtensteinstrasse 3, 6000 Frankfurt am Main 1, Fed. Rep. of Germany

[21] Appl. No.: 124,851

[22] PCT Filed: Feb. 13, 1987

[86] PCT No.: PCT/DE87/00050

§ 371 Date: Oct. 14, 1987

§ 102(e) Date: Oct. 14, 1987

[87] PCT Pub. No.: WO87/05004

PCT Pub. Date: Aug. 27, 1987

[30] Foreign Application Priority Data

Feb. 19, 1986 [DE] Fed. Rep. of Germany ....... 3605249

[51] Int. Cl.[4] .............................................. C02F 1/78
[52] U.S. Cl. ..................................... 210/752; 210/754; 210/756; 210/760; 210/143; 210/169; 210/192; 210/199; 210/206
[58] Field of Search .................. 210/752, 754–756, 210/760, 765, 169, 192, 195.1, 205, 206, 143, 199, 416.2

[56] References Cited

U.S. PATENT DOCUMENTS

| | | | |
|---|---|---|---|
| 3,326,747 | 6/1967 | Ryan et al. | 210/760 |
| 3,455,803 | 7/1969 | Miller | 210/760 |
| 3,540,592 | 11/1970 | Derreumaux et al. | 210/169 |
| 3,655,054 | 4/1972 | Pansini | 210/169 |
| 3,672,508 | 6/1972 | Simon | 210/169 |
| 3,674,216 | 7/1972 | Blair | 210/760 |
| 4,176,061 | 11/1979 | Stopka | 210/760 |

FOREIGN PATENT DOCUMENTS

| | | | |
|---|---|---|---|
| 308011 | 6/1973 | Austria. | |
| 2903772 | 8/1980 | Fed. Rep. of Germany | 210/760 |
| 2105871 | 4/1972 | France. | |
| 2237843 | 2/1975 | France. | |
| 50-79952 | 6/1975 | Japan | 210/760 |

Primary Examiner—Peter Hruskoci
Attorney, Agent, or Firm—Michael J. Striker

[57] ABSTRACT

Ozonization of the bath water taken from the reservoir (1) occurs according to the invention utilizing only 1% of ozone while using from 1 to 1.2 g/h of ozone in 700 l/h of (untreated) air from a convenient-to-handle ozonizer (7) of this capacity per 100 m[3] of natural water. Ozonization occurs without ozonization reactors and ozone destroyers under pressure directly in the conduit (2) of the natural water stream Q. For this purpose, the ozone air is whirled with a partial stream (q) of the natural water in a flow spiral (9) to form an aerosol-like mixing condition and is blasted into the main stream of natural water. The high phase interfaces thus achieved effect rapid ozonization with quantitative ozone consumption. After the uncomplicated conversion of the baths with original pure chlorination operation to the ozonization-chlorination technique according to the invention, the chemical costs can be reduced by up to 70% with a simultaneous improvement in the water quality.

25 Claims, 2 Drawing Sheets

METHOD AND AN ARRANGEMENT FOR THE TREATMENT AND DISINFECTION OF SWIMMING AND BATHING RESERVOIR WATER USING CHLORINE AND OZONE

BACKGROUND OF THE INVENTION

The present invention relates to a method of and arrangement for treatment and disinfection of swimming and bathing reservoir water with the use of chlorine and ozone and deals particularly with ozonization of natural water.

The treatment of swimming and bathing reservoir water, which will be referred to herein below shortly as bathing water, has the object of guaranteeing at any time in the reservoir a water quality which excludes an infection risk for the bathers. For this purpose not only sufficiently high disinfection action must be maintained in the bathing water, but also it is important that the water outside of the reservoir is continuously freed from dissolved and undissolved impurities and microorganisms contained in the bathing water. For providing this water treatment outside of the reservoir, the reservoir water is continuously circulated, the withdrawn natural water is purified, disinfected, and supplied back into the reservoir with addition of a surplus of a disinfection medium as pure water. The relations here are very complex since the "swimming bath" system is influenced by a plurality of parameters which will not and cannot be discussed in their entirety. This problem is discussed in several publications, for example "KOK-Richtlinien fuer den Bäderbau", 2. Auflage (1982), W. Tümmels Verlag, Nürnberg; W. Roeske, "Schwimmbeckenwasser", Anforderungen-Aufbereitung-Untersuchung, Verlag O. Haase, Lübeck (1980); and especially in"Deutsche Norm DIN 19 643 Aufbereitung und Desinfektion von Schwimm- und Badebeckenwasser", April 1984, developed from Normenausschuss Wasserwesen in DIN Deutsches Institut für Normung, in which a full list of further literature is presented.

A partial review of the requirements in accordance with DIN 19643 as to the water condition of the bathing water and to conventional steps for obtaining the desired quality of the reservoir or bathing water is presented later in Table 1.

As mentioned the disinfection is of special importance for the treatment of swimming reservoir water. A good disinfection agent must rapidly destroy or deactivate pathogenic germs in water and maintain the number of germs as low as possible. The bathing water must have a colony number of at most 100 per ml and Escheria coli bacteria (*E. coli*) as indicator germs for fecal impurities must not be detectable. In the ideal case the disinfection agent must be algicidal, fungicidal, bactericidal and virus deactivating, or in other words have a wide action spectrum. It should be taken into consideration (as disclosed in the publication Roeske, mentioned herein above, pages 204 et seq.) that the action of the disinfection agent must not only provide a direct chemical influence upon the microorganisms, but must also produce and maintain a redox potential in water, at which the microorganisms cannot survive. A certain redox system with a limited redox potential range and a certain pH value is present in the cell of a microorganism. When the redox potential of the surrounding water exceeds a limiting value of this range, it affects the metabolism of the microorganism, making it incapable of maintaining life. A "safety" redox potential for swimming bath water has a value of above approximately 600 mV for killing after an operating time of below one minute.

The disinfection agent must be used in a minimum concentration, so that it does not corrode the mechanical devices and does not have toxic or damaging side effects upon the bathers. It must be taste and odor-neutral, sufficiently stable in water for producing a sufficient and prolonged germ destroying action (depot action), must provide in addition to the disinfection action also an oxidizing action upon the materials contained in the water without producing damaging compounds with it, must not additionally load the water in that the reaction products must biologically decompose, must be produced with economically acceptable costs, and moreover must allow reliable, safe and accurate dosing and be reliable, simple and fast for determination of its concentration in water. Such an ideal disinfection agent is not known, while chlorine gas and some chlorine compounds satisfy a great part of the enumerated requirements. For bathing water disinfection, especially chlorine gas is a good choice as a disinfection agent. The disadvantages which are connected with the use of chlorine are well known, and in addition to odorous annoyance, it leads to eye irritation and skin incompatibility. As for the odorous annoyance and eye irritation it has been recognized that only the elementary chlorine dissolved in water or its hydrolysis products such as hydrochloric acid or hydrochlorous acid are responsible, but also the conversion products of ammonia derivatives (chloroamines) which are present in water are responsible for this phenomenon. In the chloroamines the chlorine is present as "bound" chlorine which however can be partially released.

For bathing water treatment, also ozone found its use. It is a strong oxidation and disinfection agent which can be used for water treatment. Ozone has very good bactericidal, virucidal and sporocidal properties and can partially flocculate colloidal materials distributed in water. Furthermore, it improves the odor, the taste and the optical properties of the water. The oxidizing decomposition of organic water loading materials is increased by ozone. The disadvantages of the ozone is that it is very poorly soluble in water, is destroyed relatively fast, and because of its considerable toxicity must not be used in reservoir water. This leads to the fact that the ozone cannot be utilized as depot oxidant and disinfecter in reservoir water, however is used with high cleaning advantages during water treatment outside the bathing reservoir. As compared with the use of a pure chlorine for water treatment, the ozone when used in combination of chlorine and ozone allows saving of considerable quantities of chlorine. It has been known in the prior art to provide such conditions that the natural water withdrawn from the reservoir after at least one filtration is treated with ozone in surplus for destroying or inactivating the microorganisms contained in natural water and decomposing the organic loading material, and after the ozonization the chlorination of natural water takes place which is supplied into the reservoir. Because of the toxicity of the ozone, conventionally the water after the ozonization and before the chlorination is supplied through an activated carbon filter, in which the ozone dissolved in water is catalytically decomposed. In accordance with the KOK regulations the pure water which flows to the reservoir must have no ozone or an ozone content which does not exceed 0.01 g ozone/m³ fresh water.

The production of ozone and the ozonization of the natural water (occasionally identified herein below as treatment water if the not yet pure natural water has been subjected to at least one purifying step) is performed approximately in the following manner. Ozone is produced mainly from air, in some cases also from oxygen, and as a rule by quiet electrical discharge with voltage between 6000 and 20,000 V. In the case of air, ozone-air mixtures with an ozone gas concentration of approximately 2 volume percent is produced. For production of 1g of ozone with the use of dry atmospheric air, an energy consumption of 15-30 Wh is required. In the above described circumstances the initial gas such as air or oxygen gas must contain neither moisture, nor dust or catalytically active substances, to prevent a premature destruction of the formed ozone. The utilized oxygencontaining gas must be mechanically purified as far as possible and dried to a dew point under 228 K ($-45°$ C.).

A modern ozone producing installation with a throughput of approximately 800–1000 g of ozone per hour costs, with required auxiliary units and devices, approximately 500,000 DM or more. It is a high technology installation with maintenance expenses which are not insignificant, and it requires skilled maintenance personnel. As for the operating costs, the energy cost with an energy consumption of 15–30 kWh per 1 kg ozone is a great portion thereof. For an ozone consumption of for example 1.15 kg/h which is suitable for an indoor pool identified as the bath number 3 in Table 2, the energy consumption for the ozonization amounts to approximately 1714 -35 kWh per hour or approximately 20014 -400 kWh per day for 12-hour operation. For outdoor pools, particularly outdoor pools with wave operation, the ozone consumption and its costs are even higher.

The produced ozone is supplied into the treatment water through injectors or in scrubbers which operate in accordance with the counter-current principle. In the prior art 0.5–1.5 g of ozone is consumed for each m³ of water. This ozone addition is very high to provide very good disinfection and oxidation effect of the ozone and is explained by the low solubility of the ozone in water and the technique of its use. In accordance with this technique the ozone in counterflow containers or in reaction hoses is bubbled in form of more or less big gas bubbles of the air-ozone mixture (mixing ratio ozone: air approximately 1:50) under normal pressure through the water, or in the case of reaction hoses with conventional vertical winding course mixes poorly with the aqueous phase and only flows more or less along it. The reaction times of the ozones with the water or in other words the average dwelling time of the water in the reaction containers, also amounts to between 1 and 1.5 minutes.

All known ozonization methods operate in the open for the ozone-air mixture. The considerable gas quantities which have not dissolved in water are withdrawn from the reaction vessel through its head, and because of the physiological requirements of an ozone-free reservoir water, the ozonized treatment water must be finally cleaned from ozone. In general, this ozonization technique is very expensive both in view of its investment costs and its operating costs, and the economy of the disinfection agent chlorine outweighs the ozonization costs only by a small fraction. The special advantage of the ozonization lies however in a direct effect of the reduced chlorine utilization. In the event of the ozone assisted bathing water treatment, the chlorine as opposed to the pure chlorine utilization, no longer plays the double role of the cleaning of the natural water and the adjustment and maintenance of the chlorine level of "free chlorine" in the reservoir water, but it performs only the last mentioned function. As a result of this, there is a lower concentration in the reservoir water of reaction products of chlorine in particular the undesirable chloroamines, and in general a better water quality is obtained, so that the circulation intervals for the reservoir water can be reduced.

Because of the installations and cost required for the conventional ozonization technique, the water treatment with chlorine and ozone has not found a general application. Countries with hundreds and thousands of bathing facilities are known, in which a chlorine-ozone treatment is not used at all. Moreover, a conversion from swimming baths which operate purely with chlorine to a chlorine-ozone treatment of the bathing water has never been realized in the prior art.

The invention is based on these circumstances.

SUMMARY OF THE INVENTION

It is an object of the present invention not only to make possible an ozone-assisted bathing water treatment and disinfection both from technical considerations as well as cost considerations and, in particular, in technically or economically efficient manner to equip the baths which have formerly been operated only with chlorine as water treatment and disinfection agent for a chlorineozone treatment of water, but also it is an object of the present invention to reduce the total operating costs to a level which is lower than the former cost of the purely chlorine-cleaned baths. This subsequent equipping is performed without technical reconstruction of the existing installations and with further utilization of the existing devices.

For achieving these objects, first the basic problem of the expensive and wasteful ozone utilization in the prior art was to be overcome. A focussing point of this was to increase on the one hand the efficiency of the used ozone so as to consequently provide an ozonizer with a low capacity and in some cases with lower ozone productivity, which does not form a very bulky installation, but instead is a convenient, accident-proof and maintenance free device.

As for the ozonizer, it is a compact convenient-tohandle device (size 40 cm×40 cm×20 cm) which is characterised by the following performance data; maximum current consumption 50 W at 220 V and 5014 -60 Hz, air throughput 700 l/h, maximum ozone production 1.2 g $O_3$/h.

For increasing the efficiency of the ozone in treatment water it is taken into consideration that reduction of the size of the gas bubbles of the introduced ozone-air mixture which increases their effective surface produces close mixing of the gas mixture with the water operating in a closed system, from which no ozone-air mixture depleted in ozone must be withdrawn. Ozone is used only in quantities which save ozone annihilation and devices.

This problem of the close mixing of the air-ozone mixture with the treatment water is solved in accordance with the present invention based on the results of the following model experiment: a partial stream from a main stream of flowing water transported in a pipe or hose is withdrawn in a pipe or hose, an injector operating with a negative pressure brings into the partial stream approximately 40% of its throughput of air, the air volume being based on the natural atmosphere pressure, and the water-air mixture with a flow speed from approximately 1.5 m/s is transported through a conduit section in the form of a spiral with several vertical windings, so that the air is distributed in water to a milky foam or froth-like distributing condition like a spray or aerosol which remains visible in the main stream when joining it.

With the use of this method developed according to the invention for close mixing of flowing liquids and high volumes of gases which are not soluble or are sparingly soluble in it for ozonization of water, unexpected and surprising results are produced in practice with use of the above described ozonizers. These results will be sketched below and will be schematically shown on a figure and illustrated by comparison data provided in tables.

In the practical experiment which is illustrated by Tables 3–5 for indoor and outdoor baths for which the water treatment was first performed only with chlorine, mainly chlorine gas, a partial stream is withdrawn from the stream of the treatment water in the natural or treatment water conduit in a quantity of 1.7 m$^3$/h. From the above described ozonizer, constantly approximately 1 g of ozone (maximum 1.2 g ozone) is introduced into approximately 700 l of air per hour and admixed in accordance with the above described method with the partial stream which thereafter is again united with the main stream of the treatment water. Bacteriological tests show that at least 90% of the microorganisms previously contained in the natural water, immediately after the joining become lifeless in fractions of seconds. In the joint stream the water is chlorinated with the available chlorine introducing device and supplied as pure water up to 1.5 min. nor an ozone exterminator for destroying the unused ozone contained in the water are necessary.

Such a conversion of the purely chlorine-purified baths to a chlorine-ozone treatment of the natural water is therefore a technically simple and inexpensive, extremely effective and moreover water-quality increasing approach. It is to be understood that this concept of the chlorine-ozone water treatment in accordance with the present invention can be used advantageously also for the new arrangement of baths. The present invention which is considerably less expensive in continuous operation than the pure chlorine process and eliminates the comparatively immense installation costs and high operating costs of the conventional ozone process, uses the advantages of ozonizing without significant equipment and energy expenses comparable with the prior art.

The invention will be described in more detail below with reference to two schematic figures and its performance compared to the prior art will be illustrated in more detail with reference to tables.

DESCRIPTION OF THE PREFERRED EMBODIMENTS

Figure 1:
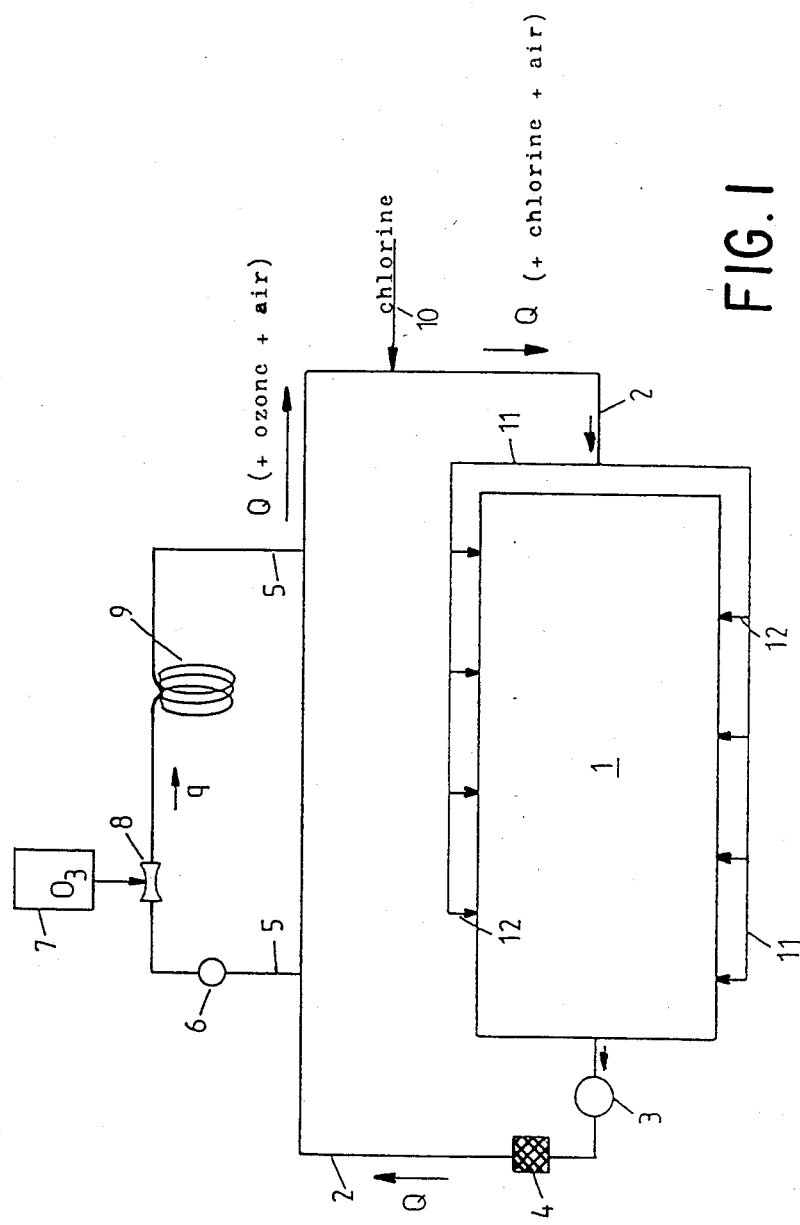
FIG. 1 is a view schematically illustrating one embodiment of the present invention.

FIG. 1 shows a diagram of the water run of a swimming or bathing reservoir with chlorine purification and additional ozone purification according to the invention.

A ring conduit 2 for the withdrawal of natural water, the water treatment stages and the supply of pure water leads from the reservoir and into the reservoir 1. The outgoing natural water is composed of the surge and overflow water and/or directly withdrawn reservoir water. The joint natural water stream is supplied by at least one pump 3, and at least one filter 4 for retaining the floating particles and partially other impurities contained in the natural water. The utilization of flocculants, filter aids and the like and the use of further treatment means is also possible. They are known from the literature. Apart from the parts 5–9, the device is substantially conventional, including a chlorine supply 10 corresponding to the type of chlorine chemical and also to the technique of chlorine metering. In the event of a reservoir 1 with transverse throughflow, the pure water is returned back via a conduit branch 11 and supply elements 12 into the reservoir 1. Additional further devices, such as devices for regulation of the pH of the reservoir water, automatic measurement devices, manually or automatically controlled metering devices and the like are not shown in the drawing.

In accordance with the invention, from the hourly total stream $Q_h$ of the treatment water, an hourly partial stream $q_h$ is withdrawn via a bypass 5 by a booster pump 6 in the amount of 1.7 m$^3$/h. This hourly partial stream $q_h$ is supplied with an ozone-air stream of preferably 1 g/h ozone in approximately 700 l/h of untreated air (relative to the atmospheric pressure) from the ozonizer 7. The ozone-air mixture is introduced by means of a negative pressure injector 8 with a whirling chamber. The water-ozone mixture is then thoroughly mixed in a spiral 9 at a flow speed from 1.5 m/s and then supplied into the main stream. The total stream $Q_h$ of the natural water advantageously amounts to approximately 100 m$^3$/h.

For obtaining a fine, foam or spray-type aerosol-like dispersion of the ozone-air-water mixture in the spiral 9, it is sufficient when the mixing spiral 9 is formed as an oval composed of at least three windings in a vertical plane with a height of approximately 1.5 m and its mixing length amounts to 614 -10 m.

A typical arrangement for ozonizing of the natural water in accordance with the invention includes an ozoniser 7 with an air throughput of 700 l/h of non-pretreated or to-bepretreated atmospheric air and an ozone producing rate of 1-1.2 g/h ozone. It also includes a mixing spiral 9 with a mixing zone of 6–10 m in three windings of a pipe or hose 314 -4 inch (1.9 cm) in diameter or in other words a flow cross section of 2.85 cm$^2$, and the mixing spiral 9 is preferably vertically oval preferably with a height of 1.5 m. The supply pressure which acts in the spiral and is maintained by the pump 6 is approximately 1.5 bar above the supply pressure of the natural water main stream which amounts to approximately 0.7 bar above the atmospheric pressure.

Typical operating data are a natural water throughput $q_h$ of 1.7 m$^3$/h through the spiral 9. The flow speed resulting therefrom, first without addition of an ozoneair stream is equal to 1.66 m/s (1.7 m$^3$/h: 2.85 cm$^2$) in the spiral 9. When the natural water stream $q_h$ is supplied with 700 l/h ozone air whose volume throughput can be estimated under consideration of a pressure of 0.7 bar over-pressure in the natural water main stream conduit and 1.5 bar over-pressure over it in the mixing spiral at approximately 0.3 m$^3$/h, the water-ozone-air stream in the above mentioned mixing spiral 9 is characterized by a flow speed of approximately 2 m/s. Because of this relatively high flow speed, the inner pressure and the forced deflections in the spiral windings cause high turbulence and the desired fine mixing of the ozone air and the natural water in the bypass. An additional mixing action is produced by an opposite flow tendency in the rising part of spiral 9. The high flow speed with which the aerosol-like auxiliary stream is thrown into the natural water main stream, provides finally such a mixing condition in which the ozone air is present without separation with high exchange surface for an effective ozonization in the natural water.

In accordance with the prior art, for the ozonization, up to 1.5 g ozone per m$^3$ of natural water is added, for a contact time between water and ozone up to 1.5 min and for exterminating the unused ozone dissolved in water or entrained therewith. In accordance with the present invention it is sufficient to add to each m$^3$ of natural water approximately only 0.01 g ozone, or in other words starting from an initial concentration which is substantially only so high as regulated by DIN 19643 for natural water with permissible ozone content of the water after the use of the ozone exterminator. So in accordance with the invention neither ozone extermination, nor a reactor for the ozonizing is needed since it is performed according to the invention in the flow pipe for the natural water main stream. The conduit path between the point of the uniting of the ozone-containing auxiliary stream with the natural water main stream and the entrance into the bathing reservoir of generally 6–20 m is completely sufficient. Since in accordance with the present invention ozone extermination can be dispensed with, it remains unimportant whether the addition of the disinfection agent chlorine is performed before or after the ozonization. Both options are possible.

It is to be understood that here a standard process is described, and for example deviations are possible or desirable in an increase of the hourly throughflow quantity q$_h$ for the by-pass stream of the natural water with respect to the added ozone quantity of 1–1.2 g/l and thereby an increase of the throughflow speed through the mixing spiral 9 is possible or desirable.

When ozone generators mentioned herein above are used which at the full capacity produce 1.2 g of ozone per 700 l of air hourly, the inventive process allows conditioning of a reservoir water volume of 600–800 m$^3$ perfectly if realistically the circulating intervals amount to approximately 5–7 hours for the entire reservoir of water. The chlorine saving amounts to 70% or more of the chlorine consumption of the pure chlorination procedure, and moreover an improvement of the bathing water quality takes place. For greater reservoir water volumes, several ozonizers are required with a capacity of 1.2 g/h, which can be arranged near one another or one after the other for their utilization.

Some performances of the present invention are illustrated in Tables 1–5. The Tables 1 and 2 show the requirements of the reservoir water (Table 1) or the practical prior art (Table 2) for the Federal Republic of Germany. The data of the Tables 3–5 show the requirements of quality of the reservoir water in accordance with the U.S.A. requirements and, in comparison with the experiments with the baths in the U.S.A. conducted in accordance with the present invention. In the Federal Republic of Germany the state standards are applicable, while for the safe bathing water in the U.S.A. the water value can vary widely in accordance with the requirements of communal administrative districts.

The German regulations in accordance with DIN 19643 (Table 1) are based, briefly, on the following considerations. The factors which influence the action of the chlorine preparations for water disinfection are the content of free acting chlorine ("free chlorine", in particular $Cl_2$, hydrochlorous acid or hypochlorite), or in other words the chlorine surplus in the bathing water, the reaction time, the degree of contamination, and the germ content of the water. Also, the temperature and particularly the pH value of the water play a role. As has been known for almost 15 years, there is a connection between the redox level produced by chlorine and the germ destruction or virus inactivation. The destruction speed is not dependent upon the content of free chlorine at a predetermined pH value, but is determined by the height of the redox potential at a respective existing pH. The height of the potential is dependent upon the concentration ratio of an oxidation agent (for example chlorine) to a reduction agent (for example impurities). The redox potential which exists in a chlorinated water is an exact gauge for the oxidizing and disinfection action of the respective disinfection agent, and the instantaneously present impurity in the water is considered and entered in the measurement. The same chlorine content can provide in water a low or a high redox potential, depending on the concentration of the impurities in water. This means that the more impurities are removed from the bathing water for example by flocculation and filtration, the better is the disinfecting action of the chlorine and the lower is simultaneously a chlorine depletion in the reservoir water by consumption of free chlorine with formation of "bound chlorine" in form of chloroamines particularly from decomposition products of urea (introduced in addition to other reasons by sweat and urine of the bathing persons). As mentioned herein above, it is exactly the chloroamines which are responsible for eye and skin irritation and odor problems, and not the free acting chlorine. During technical accidents it has been found that a content over 8 g of free chlorine per m$^3$ of the bathing water with the bathing persons does not lead either to eye irritation, or to odor annoyance.

As can be recognized and also mentioned herein above, ozone applies a flocculating action and decomposes organic loading matter of the water in oxidizing manner, so that with the use of ozone also such water impurities can be reduced which lead to chloroamine formation. Thereby the chlorine use can be reduced and the bathing water quality can be increased.

The practical requirements of the reservoir water also include complete E.coli-germ destruction in the bathing water at pH 7.0 within one minute, with a pH and temperature-dependent redox potential of at least 650 mV measured relative to a saturated calomel reference electrode, or 685 mV measured relative to a silver/3.5 m KCl/silver chloride reference electrode at 25° C. Table 1 presents values for the practical requirements of the bathing water based on the above described findings and observations.

With small deviations depending on the process combination (cooperation particularly of filter devices and used disinfection chemicals), a reliable disinfection action on the one hand and increased water quality of the reservoir or bathing water on the other hand is provided with a concentration of free chlorine between 0.3 and 0.6 g/m$^3$ of bound chlorine of maximum of 0.5 g/m$^3$, and a redox potential of at least 700–770 mV depending on the pH value of the bathing water and the used reference electrode type. The data presented in the Table 1 have been explained herein above. The given values relate to fresh water. For other waters, such as for example sea water or thermal water, relatively small deviations take place.

Table 2 shows several operating and consumption data for three German baths operating in accordance with DIN 19643. The bathing water in baths 1 and 2 is treated only with chlorine gas, while the bath 3 operates with the conventional ozonization-chlorination technique. Though incomplete, Table 2 gives an impression of practical chemical consumption, with absolute consumption and consumption per opening hours and the total reservoir volumes in accordance with standards. The values here are average values. Consumption peaks with full bath load or chemical consumption outside the opening time, for example for water conditioning for the next day including possible shock chlorination overnight, are presented in the given average values. Without further specifying, the hourly actual chemical dosing per m$^3$ of natural water must remain constant, so that a specific consumption under the realistic assumption of the circulating time of 5–7 hours can be estimated per total volume of the reservoir filling. The data of the chlorine concentration in bath 1 deal with the variations which have been observed over a long time, and the underlined values are measured most frequently. The smaller chlorine consumption in bath 3 as compared to bath 2 can be attributed to the chemical-consumption-favorable indoor operation on the one hand and the additional ozonization on the other hand. The results of the present invention are illustrated in Tables 3–5 in which consumption and water data of baths in the United States are compared. The left column of these tables deals with corresponding data related to the original pure chlorination operation, and the right column deals with the corresponding values after conversion of the bath to the ozone-assisted bathing water treatment in accordance with the present invention. These tables are formed similarly to the Table 2, and the explanations presented in the latter are applicable to these Tables as well.

As for the concentration of free chlorine, it can be seen that these values considerably exceed the standard values in accordance with DIN 19643, which is explained by a more demanding understanding or an accepted philosophy of a "safety water" in accordance with the U.S. conception. In accordance with this conception, a bathing water can be maintained reliably germ-free under all circumstances only when a more than sufficient surplus of a disinfection agent, here free chlorine, is provided in water, so that also in the event of some sudden loading of the water, a sufficient oxidation and disinfection reserve is available. Negative results of this increased chlorination must be taken into consideration, such as increased chlorine consumption and connected therewith inclination to an increased chloroamine formation. In this aspect, the advantages of the ozonizing in accordance with the present invention are effective for a considerably reduced chlorine consumption and connected therewith reduction of the concentration of bound chlorine which are especially favourable.

Individual aspects will be clarified herein below with reference to the Tables 3–5. Bath 5 is a whirlpool with a water temperature 40° C. and water which is not treated by elementary chlorine, but instead with "liquid chlorine" (such as sodium hypochlorite solution). A special cost factor lies in the utilization of means for pH adjustment and also of cost-intensive anti-foaming means, since the warm and strongly whirled water because of the impurities, especially because of the increased sweat extraction of the user, tends to an undesirable foam formation. With the use of the process and the arrangement of the present invention, or in other words after installation of a device composed of 1.2 g/h ozone—700 1/h air ozonizer 7 and a mixing spiral 9, the chemicals cost can be lowered with simultaneous doubling of the maximum concentration of free acting chlorine by 65%, or in other words to 35% of the earlier chemicals cost.

In Bath 7 the reduction of the chlorine gas consumption by approximately 85% is achieved with the use of four of the described ozonizers. This drastic reduction can be explained as follows. The bath is subjected to frequent use and required originally an extremely high chlorine supply since the nature of the wave bath results in high chlorine loss into the air. With ozonizing in accordance with the present invention, a considerable part of the impurities which are decomposed by chlorine in natural water are destroyed by ozone and removed for chlorine depletion. As a result of this, the relatively low chlorination requirement minimizes the loss to the air.

Bath 8 for an ozonization-chlorination treatment after conversion from the pure chlorine purification of the water in accordance with the present invention produces a reduction of the chlorine gas consumption in the medium by approximately 65%. Widely used bacteriological research performed over two months shows the following results. Each week three to four water samples were taken at several locations in the reservoir and bacteriologically tested for *E. coli* and other germs, and the germ number was determined per 100 ml of water sample in accordance with the known Coliform test. All samples were free of *E. coli* and had a germ number (MPN) under 2.2, which is a very good value. Further, during the bath conversion the following inlet effect is found. During starting of the device, the germ number was greater than 16, and after three days was reduced to below 2.2, at which it remained constant for the two-month test period. Additional tests were conducted as follows. A sample 1 was taken at the reservoir inlet for the pure water with running ozone-producing device, the ozonizer was turned off and after five minutes a sample 2 was drawn, and after resumption of the operation of the ozonizer a sample 3 was finally taken. The bacteriological tests of these samples showed that in samples 1 and 3 (with ozone operation for the water treatment) the water bacteriologically corresponds to the regulations, while the water of sample 2 (without ozone operation for the water treatment) did not satisfy the respective requirements.

All baths operated according to the invention were welcomed by the bathers because of the drastically increased water quality as compared with the earlier conditions, with respect to its clearness, eye and skin irritation, and odor annoyance. For the manager of the baths, there is considerable reduction of the continuous chemical and operating costs, facilitated cleaning of the paint, tiles and joints of the bathing reservoir. As mentioned, this is achieved while maintaining and further operating the original purification devices for the reservoir water and only by additional installation of one or more commercial and inexpensive ozonizers and admixing of ozone in a ratio of appoximately 1:100, as compared with the conventional ozone consumption for natural water in a non-aerated conduit system which is under pressure by the method according to the invention.

The nature of the method of treatment and disinfection of bathing waters with the use of chlorine and ozone indicates that it is sufficient for each 100 m$^3$/h of treatment water to introduce constantly only 1–1.2 g/h of ozone in 700 l/h of atmospheric air, and chlorinate the treatment water in accordance with the requirement for adjustment and maintenance of the desired redox potential or content of free chlorine in the reservoir water. Even if ozonization is not sufficient to disinfect the natural water to the required germ degree, the disinfection deficit is eliminated by the chlorination, and a further considerable lowering of the water treatment and disinfection costs is produced.

It should be noted that the economical results in accordance with the present invention are produced with continuous automatic reservoir water-controlled addition of the disinfecting chlorine chemicals. The water control can be performed via the redox potential or the concentration of free chlorine in the bathing water.

Finally, another assumption must be made that the excellent mixing effect of the spiral 9 and the resulting fast ozonization effect are due not least to the high air supply in the ratio of 700 l/h of air (at normal pressure) per approximately 1.7 m$^3$/h of the branched natural water stream in the presented example. The high air content itself directly causes the observed dispersion of the mass stream accelerated in the spiral to at least 1.5 m/s into a mixture of gas bubbles and water droplets. In addition it should be mentioned that the practical experiments for ozonization in accordance with the present invention were performed also with higher natural water streams, in bypass 5, for example of 5 m$^3$/h with the use of 700 l/h of ozone air and also with highly advantageous results. For ozonization, the ozone air-water stream is finally accelerated in accordance with the flow diameter and the length of the spiral 9 so that the above described froth or aerosol-like mixing condition arises and the ozone air-loaded partial stream of natural water is blasted into the natural water main stream for sufficient whirling or mixing with it. In ozone air mixtures which are used in conventional techniques, with ozone contents of 1 g of ozone in only 45–50 l of air (compare for example Table 2, Bath 3), the fast ozonization effect which is produced according to the invention might possibly be absent. Comparison tests into this aspect have in fact not (yet) been conducted, in particularly because the excellent results of the present invention were obtained with the use of the proposed inexpensive 1.2 g/h ozone—700 l/h air ozonizing device 7.

A further, but more detailed example concerning the results with respect to improvements in the water quality and the saving in chemicals with the conversion of reservoir water treatment from an original treatment and disinfection only with chlorine gas to the method according to the invention is given herebelow. It is shown in particular that the effects of the ozone-chlorine water treatment according to the invention do not occur spontaneously, rather that with the conversion from chlorine purification to ozone-chlorine purification according to the invention the water purification system goes through a run-in phase of up to several weeks until stable conditions appear. In this respect, the results given for the examples according to Tables 3 to 5 are thus to be understood as operating results after the run-in phase has ended, i.e. after the purification system has adjusted itself to stable conditions.

In a German indoor pool with two swimming reservoirs, the reservoir water of which was hitherto treated and disinfected conventionally according to DIN 19 643 using chlorine gas, an ozone device corresponding to the invention (1.2 g of ozone in 700 l/h of air per hour) was installed and put into operation for each reservoir according to the principle shown in FIG. 1. The original technical equipment of the bath remained unchanged. The description of the swimming reservoirs and a few operating data for the original reservoir water treatment with only chlorine gas as the disinfection agent and for the reservoir water treatment with ozone and chlorine according to the invention are compiled in Table 6, whereby the operating results for the method according to the invention again indicate those conditions after the purification system has stabilized. Regarding the type of use of the reservoirs, it is noted that reservoir 9a is the usual reservoir for swimmers, while reservoir 9b is especially provided for non-swimmers, for those learning to swim and for use by school children during swimming lessons and that generally there are a high number of visitors to the reservoirs.

With the start of 24-hour operation of the ozonization devices according to the invention the operating data of the reservoirs 9a and 9b were followed and recorded for a period of approximately three and a half months and the concentration of the bound and free chlorine in the reservoir water was determined three times daily, namely at the start and end of bathing operation and at noon of each operating day. The results relating to the content of bound chlorine in the reservoir water are compiled in Table 7 according to weekly average values. The values of the concentration of bound chlorine in the reservoir water as an average value and determined daily for two weeks prior to the start of the ozonization-chlorination process according to the invention precede these values, whereby it is pointed out that higher values in the range of 0.5 to 0.6 bound chlorine/m$^3$ reservoir water were previously entirely common in the bath 9 and could not be avoided in order to maintain the required minimum concentration of free chlorine of 0.3 g/m$^3$ (see Table 1).

From Table 7 it can be seen that the concentrations of bound chlorine of at first over 0.4 g/m$^3$ could be lowered during the course of approximately 4 to 10 weeks to the excellent value of 0.05 g/m$^3$, which then remained constant. Whereas the maximum concentration of bound chlorine (see Table 1) permitted according to DIN 19 643 could not be adhered to prior to use of the invention and was constantly exceeded, the invention now makes it possible to adhere to the DIN requirements.

The following further advantages were ascertained in bath 9 following the start of the method of ozonization and chlorination according to the invention. Already three days after starting the new method a substantial improvement in the cloudiness of the water was achieved. The earlier, at times very strong chlorine odour in the indoor pool was lowered to a tolerable level following stabilization of the system and the earlier complaints by visitors about servere eye irritations ceased; rather the bathers now found the bathing water to be very pleasant. Both the chlorine consumption and also the earlier quantities of flocculants could be lowered by 50% without falling below the minimum concentration of free chlorine in the reservoir water required in accordance with DIN. The humidity in the indoor pool decreased by approximately 10%. According to DIN regulations 30 l of fresh water per bather is to be added daily. However, prior to using the method according to the invention this quantity was not sufficient so that at one time up to 50 l of fresh water per bather had to be used to maintain the required reservoir water quality. Following stabilization of the water treatment and disinfection system according to the invention, the fresh water requirement could be reduced to 30 l per bather. For this reason a quite considerable reduction in operating costs resulted for bath 9 and 40% of the costs for continious addition of fresh water, for the disposal of waste and also in energy costs for heating the fresh water to the reservoir temperature can now be saved.

Figure 2:
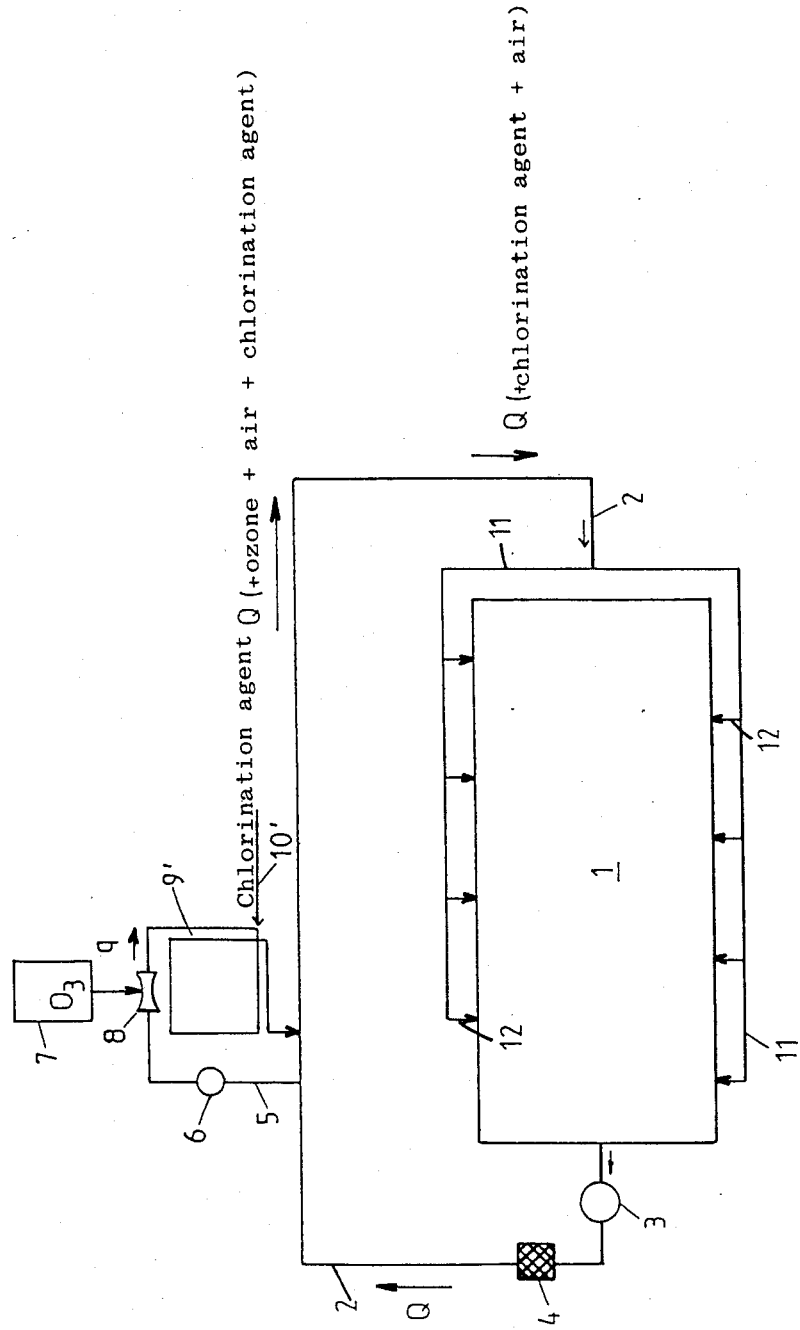
FIG. 2 is a view schematically illustrating another embodiment of the present invention.

As far as the invention has been described so far, it was assumed that the ozonization according to the invention of the natural water with the subsequent chlorination took place in accordance with the apparatus and process principle illustrated in and described with respect to FIG. 1. This means that the ozone air obtained from the ozonizer 7 and fed into the bypass 5 is whirled with the branched natural water in a spiral 9 with vertical windings to a froth-like aerosol and that the chlorination agent, namely in particular chlorine gas, possibly also "liquid chlorine" in the form of a sodium hypochlorite solution, is introduced subsequently in the main stream Q of the natural water mixed with the ozone air. The examples of the invention represented in Tables 3 to 7 are also based on this method. It could be ascertained, however, that it is not absolutely essential to provide a spiral 9 as the "mixing chamber" with a rising pipe path for forming a froth or aerosol-like mixing condition of the ozone air-water stream in the bypass 5 acting as the acceleration zone, rather that basically a pipe arrangement with linear vertical and horizontal zones, as the whirling mixing zone with vertical circulation also provides the desired formation of a froth or aerosol-like mixing condition of the ozone air-water stream in the bypass 5. Such a frame-like circulation zone in vertical planes acting equally with the function of a spiral 9 is shown in FIG. 2 and to distinguish it from an oval-shaped spiral 9 will hereinafter be referred to as a "rectangular spiral" 9'. To carry out the method according to FIG. 1, a rectangular spiral 9' can also be used instead of a preferably oval spiral 9.

Furthermore, it was ascertained that whether the metered addition of the chlorination agent occurs as shown in FIG. 1, i.e. after bypass 5 joins the main strean Q, or whether the chlorination agent is already fed into the spiral 9 or 9' does not remain without influence. Such an arrangement in which the chlorination agent is fed into a rectangular spiral 9' is schematically illustrated in FIG. 2.

FIG. 2 differs from FIG. 1 in the design of the bypass 5 and the site where the chlorination agent is introduced. Instead of a preferably oval spiral 9, a rectangular spiral 9' is used in this case as the mixing or whirling chamber, and instead of introducing the chlorination agent at a site 10 after the bypass 5 joins the circular conduit 2 of the total water stream Q, the chlorination agent is now introduced into the rectangular spiral 9' at a site 10'.

The rectangular spiral 9' with respect to its pipe cross-section and the length of the fluid circulation occurring in the vertical planes which to begin with consists of the branched natural water partial stream q and the ozone air and then in addition contains the gaseous .. or contains liquid chlorination agent, is dimensioned as the spiral 9, the description of which is referred to above.

The rectangular spiral 9' preferably forms only two vertical circulation or rotation planes and preferably has a height of approximately 1.25 m and a width of approximately 1 m. Under the operating conditions described above for the spiral 9 (natural water stream $q_h$ in the bypass 5 approximately 1.7 m$^3$/h; ozone air: approximately 1.2 g/h ozone in approximately 700 l/h air) the supply pressure in the spiral 9' or in the bypass 5 preferably lies approximately 1.5 to 2.5 bar above the pressure in the conduit 2 of the main water stream and flows through the bypass 5 at a speed of preferably approximately 2 to 3.5 m/s. A typical internal pipe diameter for a spiral 9' is, for example, 2.8 cm, just as for a spiral 9. If an oval spiral is used instead of a rectangular spiral 9' in the method to introduce the chlorination agent in the mixing or whirling zone of the bypass 5 and not in the main water stream, the pressure in the spiral 9 then likewise preferably lies approximately 1.5 to 2.5 bar above the pressure in the conduit 2 of the main water stream and also flows through the bypass 5 at a speed of preferably 2 to 3.5 m/s.

Further to the explanations given above with respect to the effect of a spiral 9 or 9', it is also noted at this point that an essentially only continuous linear and horizontal pipe guide for the bypass 5, i.e. a bypass 5 without a mixing zone (9,9') with vertically extending zones, would not or would be less in a position to produce the aerosol or froth-like intimate mixing aimed for in accordance with the invention of the required liquid phase (natural water stream q and possibly liquid chlorination agent) with the introduced gaseous phase (ozone air and possibly chlorine gas). No additional mixing effect could then be achieved in the horizontal pipe zones due to a relative movement between the liquid stream and the naturally always upwardly striving gas bubbles and in particular a phase separation would occur to the effect that a gas cushion forms between the liquid stream and the pipe wall above the horizontally conveyed liquid.

As could be ascertained with regard to an outdoor pool operated in the United States, the reservoir water of which was originally treated and disinfected through liquid chlorine (sodium hypochlorite), and which pool firstly was converted to an ozone-chlorine purification according to the method illustrated in FIG. 1 and eventually was converted to an ozone-chlorine purification according to the method illustrated in FIG. 2, saving in chlorination agent of 50% could be achieved following the first conversion (ozonization in accordance with the invention and addition of the chlorination agent (liquid chlorine) into the main water stream Q after the bypass 5 joins) and a further saving of approximately 30% of the original consumption could be achieved following the further conversion (ozonization in accordance with the invention and addition of the chlorination agent in a spiral 9 or 9')

A few data concerning this bath are compiled in Table 8.

An influence of the ozone on the reactivity or selectivity of the chlorination agent, or vice-versa, an influence of the chlorination agent on the reactivity or selectivity of the ozone could be considered as an explanation for this surprising and not easily explainable effect that, compared with the addition of the chlorination agent after the bypass 5 joins the main stream of the circulated water, addition of the chlorination agent in the spiral 9 or 9' of the bypass 5 results in a reduction in the chlorination agents required. Whereas chlorination only takes place after the ozone has to a large extent or completely reacted in the water stream Q during the method according to FIG. 1, in the method according to FIG. 2 the chlorination agent introduced into the spiral 9 or 9' reaches a medium of the highest ozone concentration.

When carrying out the method according to the invention for the treatment and disinfection of swimming and bathing reservoir water through ozonization with an ozonizer which produces up to 1.2 g/h ozone in 700 l/h air and accompanying chlorination, the chlorination agent should preferably be introduced in the mixing or whirling spiral 9 or 9', namely independently of whether chlorine gas or a hypochlorite solution is to be used.

From the explanations given so far concerning the invention it should not be concluded, however, that the aimed for intimate mixing of the natural water in the bypass 5 with ozone air or with ozone air and the chlorination agent under pressure for producing a froth or aerosol-like mixing condition of the water-ozone air fluid or the water-ozone air-chlorination agent fluid which is then introduced into the main stream of the natural water at an increased speed, can only be achieved by means of a spiral 9 or 9'. Basically, other technical devices would also be possible to achieve such a froth or aerosol-like mixing condition. It is only important that this mixing condition be achieved so that the aerosol-like fluid leaving the bypass 5 in the natural water main stream allows a reaction condition to result in the natural water main stream without appreciable separation of the gas phase from the liquid phase and with a particularly high exchange surface between the gas and liquid phase. The mixing and whirling methods by means of a spiral 9 or 9' with vertical circulation planes represents, however, a solution to the idea of aerosol formation that is technically particularly simple and at the same time can be realized effectively.

A safety advantage and a practical advantage of the invention are also discussed herebelow.

Whereas it is indispensable that the unavoidably high-capacity ozonizers according to the state of the art for the ozone-chlorine water treatment have their own safety areas, the ozonizers 7 required for carrying out the invention, which have a maximum capacity of only 1.2 g/h of oxone, can be operated in common areas without special protective measures and without concern. In this connection it can also be pointed out that the guidelines in the Federal Republic of Germany for using ozone for water treatment, according to which all ozone devices for water treatment must be accommodated in a safety area, should be amended so that ozonizers with capacities corresponding to the invention do not fall within the range of the above guidelines.

Furthermore, an ozonizer 7 for the ozone air requirement according to the invention, a mixing spiral 9 or 9' with an inlet for the chlorination agent, a metering valve for the chlorination agent and an automatic control unit for the metering valve can be accommodated in a common housing for a convenient-to-handle apparatus and control unit. This brings with it quite considerable advantages during installation and in particular during re-equipment of baths disinfected hitherto strictly through chlorination for carrying out the method according to the invention.

TABLE 1

Requirements for reservoir water in accordance with DIN 19643

| Method combination: | | (a) | (b) | (c) |
|---|---|---|---|---|
| (a) Flocculation + Filtering + Chlorination | | Chlorine | | |
| (b) Flocculation + Filtering + Ozonization + Activated Carbon Filtering + Chlorination | | | Ozone + Chlorine | |
| (c) Adsorption on Activated Carbon Powder + Alluvial filtering with Kieselgur and Activated Carbon + Chlorination | | | | Chlorine |
| Ozone Dosing, g Ozone/$m^3$ Natural Water | | — | 0.8–1.2 | — |
| Concentration in Reservoir Water, g/$m^3$ | | min/max | min/max | min/max |
| Ozone | | | —/0 = | |
| Free Chlorine | | 0.3/0.6 | 0.2/0.5 | 0.3/0.6 |
| Bound Chlorine, at | pH 6.5–7.2 | —/0.3 | —/0.1 | —/0.3 |
| | pH 7.2–7.8 | —/0.5 | —/0.2 | —/0.5 |
| Redox-Voltage, mV against | | | min/max | |
| Hg/$Hg_2Cl_2$, at | pH 6.5–7.2 | | 700/— | |
| | pH 7.2–7.8 | | 720/— | |
| Ag/AgCl, at | pH 6.5–7.2 | | 750/— | |
| | pH 7.2–7.8 | | 770/— | |

Permissible 0.01 g Ozone/$m^3$ pure water directly before entrance into reservoir

TABLE 2

Operational data of baths of a German city with a conventional water treatment:

| | Bath 1 | Bath 2 | Bath 3 |
|---|---|---|---|
| Type of use of the reservoir | Outdoor bath, summer high operation | Outdoor bath, summer high operation | Indoor bath, mixed operation |
| Reservoir volume, $m^3$ | | 4800 (3 reservoirs) | 4300 (6 reservoirs) |
| Water surface, $m^2$ | | 2200 | 2600 |
| Daily opening time, h | 13 | 13 | 12 |
| Ozonization of the natural water in accordance with the prior art g/h ozone | — | — | (3 ozone devices) 1150* |
| g/h ozone/$m^3$ reservoir water | | | 0.267 |
| Chlorine gas consumption | | 3.5–4 kg/h | 500 kg/3 weeks** |
| g/h/$m^3$ reservoir volume | | 0.73–0.83 | 0.46 |
| pH-value reservoir water | | | 7.2–7.8 |
| Concentration in reservoir water, g/$m^3$ | | | |
| Free chlorine | | 0.5–2.0:1.0 | |
| Bound chlorine | | 0.0–0.3:0.1 | |
| Redox-voltage, mV in reservoir water relative to | | | |
| Ag/AgCl | | | 650–700 |
| Hg/$Hg_2Cl_2$ | | | |
| Method combination | | | (b) In accordance with |

TABLE 2-continued

Operational data of baths of a German city with a conventional water treatment:

| | Bath 1 | Bath 2 | Bath 3 |
|---|---|---|---|
| | | | Table 1 |

*Mixing ratio ozone:air = 1 g ozone/45 l air (at atmospheric pressure)
**With automatic continuous measurement of the concentration of "free chlorine" in reservoir water and automatic chlorine gas dosing.

TABLE 3

Operating data of baths which are disinfected initially conventionally by chlorination, after conversion to the ozone-chlorine treatment of the reservoir water in accordance with the invention, in comparison for baths in the U.S.A.

| | Bath 4 | | Bath 5 | |
|---|---|---|---|---|
| Type of use of the reservoir | Indoor bath | | Whirlpool 40° C. | |
| Reservoir volume, $m^3$ | 605 | | 13.6 | |
| Water surface, $m^2$ | | | | |
| Daily opening time, h | 24 | | 24 | |
| Ozonization of the natural water in accordance with the invention, g/h Ozone | — | 1.2 | — | 1.2 |
| g/h Ozone/$m^3$ reservoir water | — | 0.002 | — | 0.088 |
| Chemicals consumption g/h/$m^3$ reservoir volume | $x^{(1)}$ | 0.65 x | $y^{(2)}$ | 0.35 y |
| pH-value reservoir water | | | | |
| Concentration in reservoir water | | | | |
| free chlorine | $1.0-1.5^{(3)}$ | 1.0–1.5 | $1.0-1.5^{(3)}$ | 1.0–3.0 |
| bound chlorine | | | | |
| Redox-voltage, mV in reservoir water, relative to | | | | |
| Ag/AgCl | | | | |
| Hg/Hg$_2$Cl$_2$ | | | | |
| Filter system | Sand filter | | Kieselgur, Pressure system | |

$^{(1)}$x = initially consumed quantity of chlorine gas per time unit
$^{(2)}$y = cost of "liquid chlorine" [sodium hypochlorite solution], mean pH and chemicals against foam formation
$^{(3)}$officially authorized

TABLE 4

Operating data of baths initially disinfected conventionally by chlorination, after conversion to the ozone-chlorine treatment of the bathing water in accordance with the invention, in comparison [baths in the United States]

| | Bath 6 | | Bath 7 | |
|---|---|---|---|---|
| Type of use of the reservoir | Outdoor bath, summer high operation | | Wave bath, 14,000–18,000 persons/day | |
| Reservoir volume, $m^3$ | 600 | | 2650 | |
| Water surface, $m^2$ | | | | |
| Daily opening time, h | 24 | | 24 | |
| Ozonization of the natural water in accordance with the invention, g/h Ozone | — | 1.2 | — | 4.8 |
| g/h Ozone/$m^3$ reservoir water | | 0.002 | | 0.0018 |
| Chlorine gas consumption per day | 7–10 kg | 2.5–3.5 kg | 225–250 kg | 32–25 kg |
| g/h/$m^3$ reservoir volume | 0.5–0.7 | 0.17–0.24 | 3.5–3.9 | 0.5–0.55 |
| pH-value reservoir water | | | | |
| Concentration in reservoir water, g/$m^3$ | | | | |
| free chlorine | 0.4–1.5 | 0.8–1.2 | 0.8–1.5 | 0.8–1.5 |
| bound chlorine | | | | |
| Redox-voltage, mV in reservoir water, relative to | | | | |
| Ag/AgCl | 700–800 | | | |
| Hg/Hg$_2$Cl$_2$ | | | | |
| Filter system | | | Kieselgur, negative pressure system | |

TABLE 5

Operating data of a bath disinfected initially conventionally only by chlorination, after conversion to the chlorine-ozone treatment of the bathing water in accordance with the present invention, in comparison [pertains to a bath in the U.S.A.]

| | Bath 8 | |
|---|---|---|
| Type of use of the reservoir | Outdoor bath, summer high operation, observation time: 2 month | |
| Reservoir volume, $m^3$ | 500 | |
| Water surface, $m^2$ | | |
| Daily opening time, h | 24 | |
| Ozonization of the natural water in accordance with the invention, g/h Ozone | — | 1.2 |
| g/h Ozone/$m^3$ reservoir water | — | 0.0024 |
| Chlorine gas consumption per day | 11.3–18 kg | 5.5–6 kg |
| g/h/$m^3$ reservoir volume | 0.9–1.5 | 0.46–0.48 |
| pH-value reservoir water | (6.7–7.8); usually 7.4 | |
| Concentration in reservoir water, g/$m^3$ | | |
| free chlorine | mean: 0.5 | (0.01–1.9); mean: 1.0 |
| bound chlorine | | |
| Redox-voltage, mV in reservoir water, relative to | | |
| Ag/AgCl | | |
| Hg/Hg$_2$Cl$_2$ | | |
| Filter system | | |

TABLE 6

Operating data for two swimming reservoir of a German indoor pool before and after, conversion from the original conventional chlorination of the reservoir water to the ozone/chlorine treatment according to the invention.

| | Bath 9 | | | |
|---|---|---|---|---|
| type of use of the reservoir | indoor pool, swimming reservoir (9a) | | indoor pool, training pool (9b) | |
| reservoir volume, $m^3$ | 500 | | 200 | |
| water surface, $m^2$ | 250 | | 100 | |
| daily operating time, h | 15 | | 15 | |
| ozonization of the natural water, g/h ozone | — | 1.2 | — | 1.2 |
| g/h ozone/$m^3$ reservoir water | | 0.0024 | | 0.006 |
| chlorine gas consumption concentration in the reservoir water, g/$m^3$ | x | 0.5 x* | x | 0.5 x* |
| free chlorine | min. 0.3 | | min. 0.3 | |
| bound chlorine | 0.4 | 0.05* | 0.4 | 0.05* |
| flocculant consumption | y | 0.5 y* | y | 0.5 y* |
| fresh water requirement per bather, liter | 50 | 30* | 50 | 30* |

TABLE 6-continued

Operating data for two swimming reservoir of a German indoor pool before and after, conversion from the original conventional chlorination of the reservoir water to the ozone/chlorine treatment according to the invention.

Bath 9 cleaning of the filter at intervals of 2 to 5 days

*Following stabilization of the reservoir water system (1 to 2 months run- in phase); particulars relating to the drop in concentration of bound chlorine in the reservoir water contained in Table 7.

TABLE 7

Progression of the decrease in the concentration of bound chlorine ($g/m^3$) in the reservoir water in the reservoir identified in Table 6 following conversion to the chlorineozone purification according to the invention. Chlorine determination was carried out daily at the start and end of the bathing operation and at noon; however, the average values of a week are given here.

| time of chlorine determination | reservoir 9a | | | reservoir 9b | | |
|---|---|---|---|---|---|---|
| | 07 | 12 | 22 | 07 | 12 | 22 |
| purification only with chlorine; bound chlorine ($g/m^3$)* | 0.38 | 0.38 | 0.43 | 0.39 | 0.41 | 0.44 |
| purification with ozone/chlorine bound chlorine ($g/m^3$) after | | | | | | |
| 1 week | 0.33 | 0.34 | 0.35 | 0.34 | 0.36 | 0.37 |
| 2 weeks | 0.21 | 0.24 | 0.26 | 0.21 | 0.24 | 0.27 |
| 3 weeks | 0.19 | 0.16 | 0.21 | 0.17 | 0.21 | 0.25 |
| 4 weeks** | 0.15 | 0.17 | 0.19 | 0.20 | 0.28 | 0.36 |
| 5 weeks | 0.05 | 0.07 | 0.09 | 0.24 | 0.27 | 0.31 |
| 6 weeks | 0.05 | 0.05 | 0.06 | 0.18 | 0.19 | 0.32 |
| 7 weeks | 0.05 | 0.06 | 0.06 | 0.16 | 0.14 | 0.18 |
| 8 weeks | 0.05 | 0.06 | 0.06 | 0.10 | 0.12 | 0.15 |
| 9 weeks | 0.05 | 0.06 | 0.08 | 0.08 | 0.09 | 0.11 |
| 10 weeks | 0.05 | 0.05 | 0.05 | 0.06 | 0.09 | 0.10 |
| 11 weeks | 0.05 | 0.05 | 0.05 | 0.05 | 0.06 | 0.07 |
| 12 weeks | 0.05 | 0.05 | 0.06 | 0.05 | 0.05 | 0.08 |
| 13 weeks | 0.05 | 0.05 | 0.07 | 0.05 | 0.06 | 0.06 |
| 14 weeks | 0.05 | 0.05 | 0.05 | 0.05 | 0.05 | 0.05 |
| 15 weeks | 0.05 | 0.05 | 0.05 | 0.06 | 0.06 | 0.06 |
| 16 weeks | 0.05 | 0.05 | 0.05 | 0.05 | 0.05 | 0.05 |

*Average values of the last two weeks before putting the ozone device according to the invention into service.
**During this week the ozone device was taken out of service for 1 or 2 days.

TABLE 8

Operating data of an original conventional bath disinfected only through chlorination following conversion to the ozone-chlorine treatment of the reservoir water according to the invention, whereby the chlorination agent sodium hypochlorite solution was fed in either after the bypass 5 joined the main water stream or in the spiral 9 or 9' of the bypass. The consumption values given for the chlorination agent relate to the stabilized purification system and to a redox-voltage of the reservoir water of on average 750 mV and a concentration of free chlorine in the reservoir water of on average approximately 0.4 $g/m^3$.

bath 10

| | | | |
|---|---|---|---|
| type of use of the reservoir | outdoor pool, midsummer 50 persons per day | | |
| reservoir volume, $m^3$ | 200 | | |
| water surface, $m^2$ | 130 | | |
| daily opening time, h | 11 | | |
| ozonization of the natural water, g/h ozone | 1.2 | | |
| g/h ozone/$m^3$ reservoir water | 0.006 | | |
| site of the addition of chlorination agent | directly into reservoir | after bypass 5 | in the spiral 9,9' |
| consumption of liquid chlorine, l/day | 18.8 | 9.4 | 5.6 |

TABLE 8-continued

Operating data of an original conventional bath disinfected only through chlorination following conversion to the ozone-chlorine treatment of the reservoir water according to the invention, whereby the chlorination agent sodium hypochlorite solution was fed in either after the bypass 5 joined the main water stream or in the spiral 9 or 9' of the bypass. The consumption values given for the chlorination agent relate to the stabilized purification system and to a redox-voltage of the reservoir water of on average 750 mV and a concentration of free chlorine in the reservoir water of on average approximately 0.4 $g/m^3$.

bath 10

(average value)

It will be understood that each of the elements described above, or two or more together, may also find a useful application in other types of constructions differing from the types described above.

While the invention has been illustrated and described as embodied in a method and an arrangement for the treatment and disinfection of swimming and bathing reservoir water using chlorine and ozone, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of treatment and disinfection of swimming and bathing reservoir water, comprising the steps of withdrawing reservoir water as natural water so as to form a main stream of the natural water; filtering the main stream of the natural water by at least one filtering unit; branching from the main stream of the natural water a partial stream of the natural water via a bypass, introducing an ozone air into the partial stream of the natural water; uniting the ozone-air containing partial stream of the natural water with the main stream of the natural water so as to form a united stream of the natural water; chlorinating the united stream of the natural water; and returning the ozonized and chlorinated united stream of the natural water as a pure water into a reservoir, said branching and introducing including per 100 $m^3/h$ of the natural water branching from the main stream a partial stream of the natural water of up to 5 $m^3/h$ and adding to the same an ozone-air stream of 1.2 g/h ozone in approximately 700 l/h atmospheric air; whirling the ozone-containing partial stream in the bypass to an intimate froth or aerosol-like mixing condition, said uniting includes blasting the whirled ozone-containing water into the main stream of the natural water at a confluence of the bypass, said returning including returning the ozonized and chlorinated united stream of the natural water without aerating through a closed conduit system into the reservoir together with an air quantity originated from an ozonizer which produces the ozone air.

2. A method as defined in claim 1, wherein said branching includes branching of the partial stream of natural water at a speed of 1.7 $m^3/h$.

3. A method as defined in claim 1, wherein said introducing includes using an ozonizer with a maximum ozone-producing rate of 1.2 g/h of ozone per 700 l/h of added atmospheric air.

4. A method as defined in claim 1, wherein said whirling includes passing the ozone-air containing partial stream under a pressure and at a speed sufficient for forming the froth or aerosol-like mixing condition through a spiral with a vertical flow circulation.

5. A method as defined in claim 4, wherein said passing includes passing the ozone-air containing partial stream through the spiral formed as a pipe.

6. A method as defined in claim 4, wherein said passing includes passing the ozone-air containing partial stream through the spiral formed as a hose.

7. A method as defined in claim 4, wherein said chlorinating includes introducing a chlorination agent into the spiral.

8. A method as defined in claim 7, wherein said step of introducing the chlorination agent into the spiral includes introducing chlorine gas.

9. A method as defined in claim 7, wherein said step of introducing the chlorination agent into the spiral includes introducing hypochlorite solution.

10. A method as defined in claim 7, wherein said passing through the spiral includes passing through a spiral which has two vertical flow circulation planes and a shape of a rectangle with a height of approximately 1.25 m and a width approximately 1 m, at a pressure in the spiral of 1.5–2.5 bar above a pressure in the closed conduit with the ozone air and the chlorination agent conveyed through the spiral at a speed of 2–3.5 m/s.

11. A method as defined in claim 4, wherein said passing includes passing through the spiral which has a conduit length of 6–10 m, and three windings in a vertical plane, with the pressure of up to approximately 1.5 bar above a pressure in the closed conduit and at the speed of approximately 2 m/s.

12. A method as defined in claim 4, wherein said passing includes passing through the spiral which has a shape of a vertically extending oval.

13. An apparatus for treatment and disinfection of swimming and bathing reservoir water, comprising a main conduit arranged for withdrawing a main stream of reservoir water as natural water from a reservoir; filtering means for filtering the main stream of the natural water in the main stream conduit; a bypass conduit for branching a partial stream of the natural water from the main conduit for the main stream of the natural water; an ozonizer with a capacity of up to 1–1.2 g/h of ozone in 700 l/h atmospheric air and arranged to mix the ozone air into the partial stream of the natural water so that per 100 m³/h of the natural water in the partial stream of up to 5 m³/h an ozone stream of 1–1.2 g/h of ozone in approximately 700 l/h of atmospheric air is introduced; means for whirling the ozone-air containing water in the bypass conduit to an intimate froth or aerosol-like mixing condition; means for uniting the whirled ozone-air-containing partial stream of the natural water with the main stream of the natural water at a confluence of the bypass conduit; means for chlorinating the united stream of the natural water; and means for supplying the ozonized and chlorinated natural water as pure water without aerating through a closed conduit system into the reservoir together with an air quantity originating from the ozonizer.

14. An apparatus as defined in claim 13; and further comprising a booster pump arranged in said bypass conduit for branching a partial stream of the natural water from the main conduit.

15. An apparatus as defined in claim 13, wherein said whirling means includes a spiral which forms a whirling chamber for the ozone air-containing partial stream in said bypass conduit, said spiral having at least two flow circulation planes in a vertical direction.

16. An apparatus as defined in claim 13, wherein said ozonizer operates in accordance with the principle vacuum extraction; and further comprising a negative pressure injector connected with said ozonizer and with said bypass conduit.

17. An apparatus as defined in claim 16, wherein said negative pressure injector has a whirling chamber for mixing gases in liquids.

18. An apparatus as defined in claim 13, wherein said whirling means includes a spiral which has an internal diameter of 1.9–2.8 cm, is provided with three windings in a vertical plane with a conduit length of 6–10 m, and has a height approximately 1.5 m.

19. An apparatus as defined in claim 18, wherein said spiral is formed as a pipe.

20. An apparatus as defined in claim 18, wherein said spiral is formed as a hose.

21. An apparatus as defined in claim 18, wherein said spiral has the shape of a vertical oval.

22. An apparatus as defined in claim 13, wherein said whirling means includes a spiral which has two vertical flow circulation planes and is formed as a rectangle with a height of approximately 1.25 m and a width of approximately 1 m.

23. An apparatus as defined in claim 13, wherein said whirling means includes a spiral which is connected with said means for chlorinating so that a chlorination agent is introduced into said spiral.

24. An apparatus as defined in claim 13, wherein said whirling means includes a mixing spiral, a part of said bypass conduit together with said ozonizer and said mixing spiral forming a transportable compact unit.

25. An apparatus as defined in claim 13, wherein said whirling means includes a mixing spiral located between a part of said bypass conduit and said ozonizer and having an inlet for a chlorination agent supplied by said means for chlorinating; and further comprising a metering valve for the chlorination agent; and an automatic control unit for said metering valve, said part of a bypass conduit, said ozonizer, said mixing spiral, said metering valve, and said automatic control unit together forming a transportable compact unit.

* * * * *